(No Model.) 2 Sheets—Sheet 1.
M. E. BLOOD.
PARCEL CARRIER FOR BICYCLES.
No. 453,311. Patented June 2, 1891.
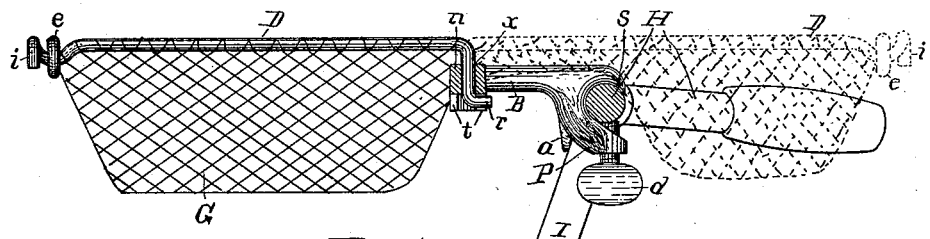
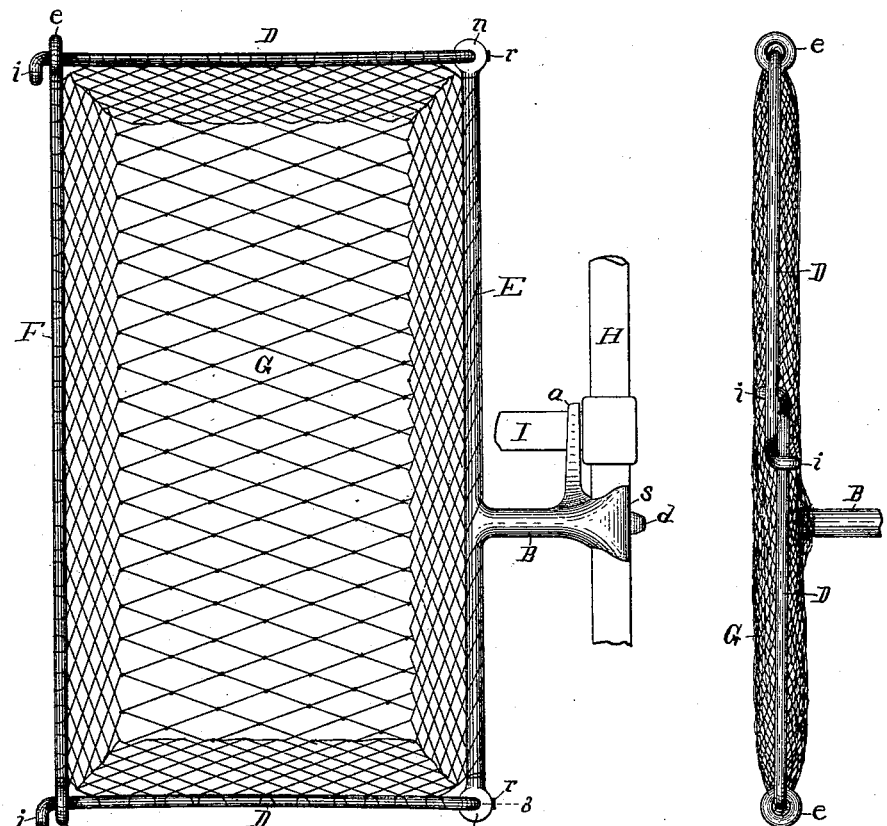
Witnesses:
Walter S. Wood
Lou M. Blood
Inventor.
Maurice E. Blood (No Model.) 2 Sheets—Sheet 2.
M. E. BLOOD.
PARCEL CARRIER FOR BICYCLES.
No. 453,311. Patented June 2, 1891.
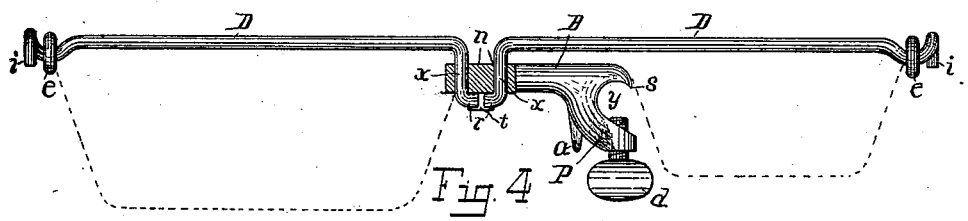
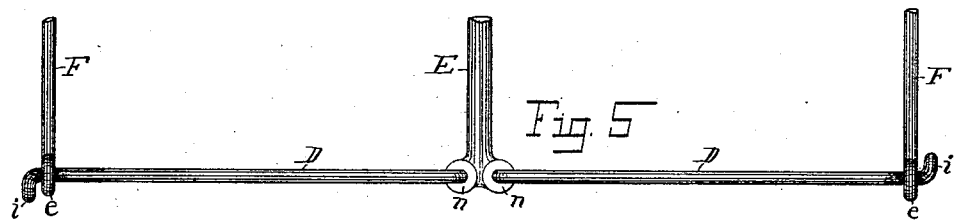
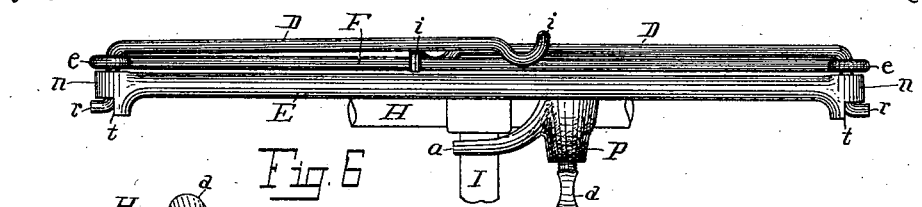
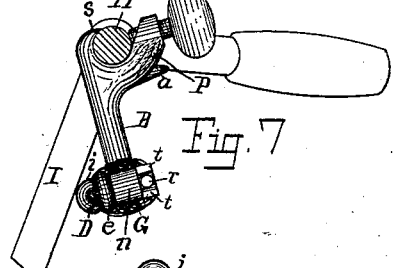
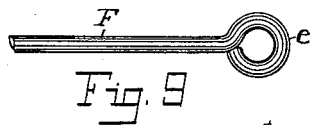
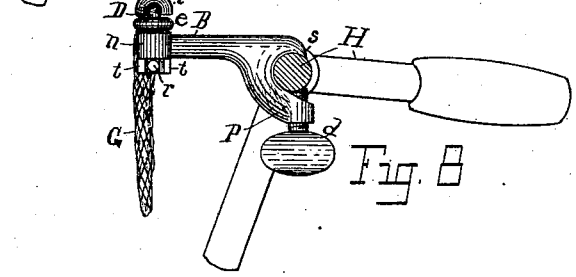
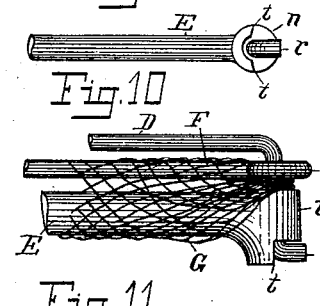
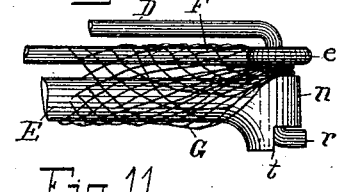
Witnesses:
Walter S. Wood
Lou M. Blood
Inventor.
Maurice E. Blood

UNITED STATES PATENT OFFICE.

MAURICE E. BLOOD, OF KALAMAZOO, MICHIGAN, ASSIGNOR TO MARY L. BLOOD, OF SAME PLACE.

PARCEL-CARRIER FOR BICYCLES.

SPECIFICATION forming part of Letters Patent No. 453,311, dated June 2, 1891.

Application filed February 11, 1891. Serial No. 381,052. (No model.)

*To all whom it may concern:*

Be it known that I, MAURICE E. BLOOD, residing at Kalamazoo, in the county of Kalamazoo and State of Michigan, have invented a new and useful Improvement in Parcel-Carriers for Bicycles, of which the following is a specification.

The object of this invention is to provide a parcel-carrier that can be constructed of the fewest possible pieces to receive and safely carry articles thrown loosely into it when it is set for use and still adapted to be closed up or folded together in a small compass when not in use, and to so arrange the parts that it can be set for use or folded up instantly, either while the rider is off his bicycle or riding it, and also to provide a double carrier to be used when there are more articles to be carried than a single one will carry; also, to provide a way to carry the carrier, when it is folded up and not in use, behind and under the handle-bar, where it will be out of the way. I attain these objects by the devices illustrated in the accompanying drawings, in which—

Figure 1 is an end elevation of the single carrier, showing it attached to the handle-bar of a bicycle and projecting in front of a handle-bar, which would be over the forward wheel of the bicycle. The dotted lines show the carrier as used in another position behind the handle-bar. Fig. 2 is a top view of the single carrier. Fig. 3 is a top view of it when folded or closed up and not in use. Fig. 4 is an end elevation of the double-carrier frame with dotted outlines of the net or bag. Fig. 5 is a sectional top view of one end of Fig. 4. Fig. 6 is a front elevation of Fig. 3, with the net or bag removed. Fig. 7 is an end view of the carrier when folded or closed up and hanging down behind and under the handle-bar. Fig. 8 is an end view of the carrier with the frame-work folded or closed up, but the net or bag hanging down in the position it would occupy before it is wound around the carrier-frame. Fig. 9 is a detail of one end of the rod, which is the front support of the net or bag; Fig. 10, a detail, being a sectional view of the bottom of one end of the single carrier, showing the lower end of the side arm or support and stops with which it engages; and Fig. 11 an enlarged detail, being a front elevation of one end of the carrier when folded, showing the relation of the net and cord to the frame when in that position.

A whole bicycle is not shown in the drawings, only enough—viz., a broken section of the handle-bar and handle-bar post, to which the invention is attached—to show the relation of the carrier to the bicycle.

Similar letters refer to similar parts throughout the several views.

The frame-work of the carrier is made in a square form, and is composed of the casting E, side arms or supports D D, and front rod or support F. The casting E is made in the form of a straight piece running parallel with the handle-bar H and supports the rear part of the net or bag, which is attached at its upper edge to the casting. This casting has an arm or portion B extending at right angles from it rearwardly and from near its center to connect it with the handle-bar H. At the rear end of the portion B there is an opening y, as shown in Fig. 4, to receive the handle-bar. This opening is formed by the curved part s on the top to hook over the handle-bar and a part P to come around on the opposite side of the handle-bar. There is a thumb-screw d in the part P, made to screw up against the handle-bar opposite the curved part s to hold the casting securely to the handle-bar. The opening y must be large enough to receive the handle-bar when the thumb-screw is turned back. The stop-finger a is a part of the casting, and is made to project from the portion B to come in front of and against the handle-bar post, and to prevent the casting from twisting on the handle-bar and swinging downward when there is a heavy load in front of the handle-bar. At each end of the casting E there is an eye or hole in the part n to receive the vertical portion x of the arm D D. The stops t t (shown in Fig. 10) are formed on the lower side of the part n, and arranged in such relation to the lower end r of the side arms D D as to allow the side arms to swing almost but not quite a half a circle. Just before the side arms D D in swinging around to the front on the rear of the casting E come at right angles with the casting E the lower ends r of the side arms D D will strike the stops t t, which will arrest the further movement of the side arms D D, except as they are sprung outwardly, the side arms D D being made of material that will spring and allow the arms to swing around at right angles with the casting E. The side arms D D, as shown in Fig. 4, are made of spring-wire and have a long straight portion which supports each side of the net or bag. Then they are bent downward near their rear ends when they pass through the eye or hole in the ends of the casting E, and then they are bent back again to lie horizontally close to the bottom of the eye or hole through which they have passed in the casting E and at an angle to come in contact with the stops t t at the proper time, as before mentioned. The forward ends of these side arms D D are bent first downward a little, then upward, and then off to one side to form a hook i at the extreme end, the hollow part of the hook being on the under side and the hook being nearly at right angles with the arm. The front rod F is also made of wire and has an eye made on each end to receive the arms D D, an arm passing through each eye. The eyes in the rod F should be the same distance apart from center to center as the eyes or holes in the ends of the casting E, and the rod F is made to slide the whole length of the straight portion of the arms D D. At the front end of the arms the rod F will drop into the downward curve of the arms and be prevented from going farther by the hooks i i. At the rear end of the arms the rod F will run over on the vertical portion x of the arms, which portion rises up from the casting E high enough to receive the rod F, and the rod F will then lie flat on top of the casting E. When the rod F is in that position, the side arms will be free to swing around from one side of the casting E to the other; but when the rod F is out to the forward end of the arms D D the arms will then be sprung outward and locked in that position with the rod F.

When it is desired to fold the frame, the rod F is moved backward to lie on top of the casting E. Then the arms D D are swung around to lie in the same position on top of the rod F. The hook i of one of the arms D D is hooked over the rod F, and the hook of the other arm D is hooked over the first arm, thus locking the frame again in that position. When the frame is to be set to the rear of the handle-bar or casting E, the side arms D D are unhooked and swung out in that direction from the casting and the rod F moved out to the hooks i i, where the frame will be locked the same as in the front position. The stops t t might be arranged in such a way as to allow the side arms D D to swing outwardly from the carrier, and in that case a cord might be used in place of the front rod F, as the side arms would have to be pulled toward each other instead of being pushed apart.

The receptacle is a net or bag G, suspended from the frame-work just described by having its upper edges on all sides attached to the straight portions of the casting E, side arms D D, and rod F. On the rods and side arms the connection can be made by running these parts through the upper meshes of the net when the net is used, and the connection can be made to the casting by running a cord of the same material as the net through the upper meshes of the net on that side, and each time it goes through a mesh winding it around the casting. The net G can be made flat and straight, but when suspended in this manner the upper edges will be gathered in and the central portion will hang lower down, thus forming a bag with a square opening at the top. Another frame might be made that would be circular in form or oval, thereby giving the net or bag a circular or oval opening at the top; but such a form to the net or bag would not be as convenient for carrying all kinds of articles as the square form, besides it would be difficult to fold such a frame in a desirable manner.

A bag made of cloth, leather, or other material could be attached to the frame by means of hoops, metallic rings, or hooks going through the upper edges of the bag and sliding over the frame. The net could also be attached to the frame by means of metallic rings or hooks.

The net or bag can be folded or closed up to be carried when not in use in the manner shown in Fig. 8. To do this, when the net or bag is set for use it is only necessary to slide the front rod F along on the side arms D D and let it lie on top of the casting E. Then swing the side arms D D around and hook them over each other and the front rod F and the net or bag will be closed up together and hang down from the casting E. To make the folding still more complete, the front rod F is first moved back to lie on top of the casting E. The net or bag as it is then doubled up is wound around the front rod F and the casting E, and then the side arms D D are swung around and hooked on top of the net, as shown in Fig. 3. The carrier will then be in a small compact form and can be carried either in front on the handle-bar or hanging down under the handle-bar, as shown in Fig. 7. All that is required to place it in the latter position is to loosen the thumb-screw d, swing the carrier over the handle-bar and around until it comes to that position, and then tighten up with the thumb-screw again. The side arms D D are bent in such a manner in relation to their pivot-points in the casting E that there will be a downward tension to the arms when they are folded that will cause the hooks i i to have a firm hold on the arms and net or bag, which makes the carrier secure in the folded position and keeps the parts so there can be no looseness or rattling.

To make a double carrier, the casting E must have two eyes or holes at each end in the part

*n n*. Two more side arms are pivoted in these, and another front rod F and net or bag is used, as shown in Figs. 4 and 5. This second carrier can be set for use and folded the same as the first one, and it can be entirely detached from the single carrier, when desired, by making the eye or hole in the part *n* of casting E large enough or in such a shape that the side arms D D can be taken out.

To remove the whole carrier from the handle-bar turn the thumb-screw *d* back until the casting will slip off the handle-bar.

I claim—

1. In a parcel-carrier for bicycles, to be attached to the handle-bar of a bicycle, the main part of the frame formed of a single metallic piece of casting having a long straight portion running parallel with the handle-bar to support one side of the receptacle and the side arms of a receptacle, and an arm portion extending from the straight portion to connect with the handle-bar, the arm portion having a forked or Y-shaped opening to receive the handle-bar, and means for securing it to the handle-bar, substantially as specified.

2. In a parcel-carrier for bicycles, to be attached to the handle-bar of a bicycle, the part which composes the main support of the carrier, formed of a single metallic piece or casting having a straight portion running parallel with the handle-bar to support one side of the receptacle, an arm portion extending from the straight portion to the handle-bar, having a forked or Y-shaped opening to receive the handle-bar, and a portion extending from the arm portion to rest against the handle-bar post, substantially as specified.

3. In a parcel-carrier for bicycles, to be secured to the handle-bar of a bicycle, the part which composes the main frame and support of the carrier, formed of a single metallic piece or casting having a long straight portion running parallel with the handle-bar and arms pivoted in each end, and an arm portion extending from the straight portion to the handle-bar, having a forked or Y-shaped opening to receive the handle-bar, and a portion extending from the arm portion to rest against the handle-bar post, substantially as and for the purposes specified.

4. In a parcel-carrier for bicycles, to be attached to the handle-bar of a bicycle, the main supporting-frame E and B, hook *s*, extension P, and finger *a*, all formed of a single metallic piece or casting, substantially as specified.

5. In a parcel-carrier for bicycles, to be secured to the handle-bar of a bicycle, the main supporting-frame E and B, end portions *n n*, stops *t t*, Y-shaped portion *s* and *d*, and finger *a*, all formed of a single metallic piece or casting, substantially as specified.

6. In a parcel-carrier for bicycles, velocipedes, or other like vehicles, the receptacle being a bag having a rectangular-shaped opening at the top, each side of the bag connected to a corresponding side of a rectangular-shaped frame, the said frame adapted to be folded together, having all four sides parallel with each other, and the bag adapted to be wound around two or more of the side pieces of the frame, substantially as and for the purposes specified.

7. In a parcel-carrier for bicycles, the main supporting-frame E and B, having side arms pivoted in the ends *n n*, and the stops *t t* to engage the side arms, substantially as and for the purposes specified.

8. In a parcel-carrier for bicycles, the side arms having a long straight horizontal portion D, vertical portion *x* to pivot on, and short horizontal portion *r* to engage with a stop to limit the swinging movement of the arm at the proper time, substantially as and for the purposes specified.

9. In a parcel-carrier for bicycles, the side arm having a long straight portion D, vertical portion *x* to pivot on, stop portion *r* on one end, and hook *i* on the other end, substantially as and for the purposes specified.

10. In a parcel-carrier for bicycles, the combination, with pivoted side arm-supports, of a front rod or support having an eye or hole at each end to receive the side arms, the front rod or support adapted to slide along on the side supports, substantially as and for the purposes specified.

11. In a parcel-carrier for bicycles, the receptacle being a net supported on three sides by metallic rods or arms which pass through the outside meshes or loops or rings in the outside meshes of the net, one of the side supporting-rods adapted to move and carry that side of the net bodily, while the net slides along on the other two rods lengthwise of the rods, substantially as and for the purposes specified.

12. In a parcel-carrier for bicycles, the receptacle being a bag hanging from rods on three sides, the bag adapted to slide lengthwise of the rods on two sides and be carried squarely along by the third rod, substantially as and for the purposes specified.

13. In a parcel-carrier for bicycles to be attached to the handle-bar of a bicycle, a parcel-carrier adapted to be folded together and swung around the handle-bar from its position when carrying the load to a position hanging down from the handle-bar and behind the handle-bar post when not in use, substantially as specified.

14. In a parcel-carrier for bicycles, the carrier adapted to be set in front of the handle-bar to carry the load and under the handle-bar when not in use, substantially as and for the purposes specified.

15. In combination with the handle-bar of a bicycle, velocipede, or like vehicle and a carrier frame or support secured to the handle-bar or handle-bar post, the arrangement of the carrier-receptacles one on each side of the carrier-support, whereby the load to be carried can be divided and made to balance itself on its support, substantially as specified.

16. In combination with the handle-bar of a bicycle, velocipede, or like vehicle and a carrier frame or support secured to the handle-bar or handle-bar post, two separate bags and their arrangement one on each side of the handle bar and support, whereby the load can be divided and one part made to balance the other, substantially as specified.

17. The combination and arrangement, in a parcel-carrier, of the support E, with two side supporting-arms D D projecting forward from the handle-bar and two like arms projecting to the rear of the handle-bar, and two bags, one on each side of the handle-bar, substantially as and for the purposes specified.

18. In a parcel-carrier for bicycles, the manner of locking the side arms when the carrier is folded by means of hooks on the ends of the side arms, which are held in place by the spring or tension of the side arms, substantially as specified.

MAURICE E. BLOOD.

Witnesses:
FRANK D. FULLER,
S. E. MEDDINS.